UNITED STATES PATENT OFFICE.

CHARLES STEGMAYER, OF NEWARK, NEW JERSEY, ASSIGNOR, BY MESNE ASSIGNMENTS, TO HARRY A. PIKE, OF NEW YORK, N. Y.

PROCESS FOR MAKING GLAZED CERAMIC WARES.

1,245,285.      Specification of Letters Patent.      Patented Nov. 6, 1917.

No Drawing. Original application filed May 27, 1913, Serial No. 770,281. Divided and this application filed November 10, 1914. Serial No. 871,261.

*To all whom it may concern:*

Be it known that I, CHARLES STEGMAYER, a citizen of the United States, residing at Newark, in the State of New Jersey, have invented certain new and useful Improvements in Processes for Making Glazed Ceramic Wares; and I do hereby declare the following to be a full, clear, and exact description of the invention, such as will enable others skilled in the art to which it appertains to make and use the same.

The present invention has relation to a process for manufacturing bricks, tiles and ceramic wares in general whereby a true vitrified porcelain surface may be successfully and cheaply joined to a common clay body by a vitrified union, with an external glaze.

One principal object of the invention lies in the production of a process whereby the above ends may be carried out with a single firing, and whereby a product of extraordinary durability and hygienic properties may be very cheaply produced. Another principal object of the invention may be stated to be the provision of a process making it possible to utilize the commonest clay for the major part of a given brick, tile or other article, without washing or expensively treating the same (beyond the necessary pulverizing) while at the same time securing all the advantages of expensive vitrified ware.

Some of the advantages resulting from the employment of the improved process in question are the following:

A great reduction in cost due to use of common clay for the principal ingredient, and the necessity of only one firing.

An improvement over the ordinary glazed tiles in the fact that the finished product is entirely impermeable to water, acids, ink etc.

The production of a true non-crazing vitrified porcelain surface, as distinguished from the soft, expensive and non-hygienic lead glaze which soon crazes and admits moisture. The articles resulting from the present improved process have a hard non-crazing surface, which is quite weather proof and frost proof.

Another striking advantage found in the present process lies in the fact that it admits of considerable variations and a wide range of temperatures in different parts of the kiln, thereby saving great losses due to imperfect articles burned in some parts of each kiln which fall below or range above the critical temperature. Furthermore where the present process is employed with articles designed to be colored, it is found that uniformity of shade can be produced in articles in different parts of the kiln, despite the inevitable differences in temperature which exist. This suits my system for employment in art work.

In the following description of my process, I shall set forth the methods employed where the common clay body is covered with a double coating; that which is next the clay being termed the "lining", and the external layer being termed the "glaze". I shall assume, for instance, that a simple flat tile is to be made.

The common clay as it is delivered to the factory in lumps is preferably prepared in the following manner. After being broken in relatively small pieces, about like nut coal, by suitable machinery, it is delivered upon a platform where the fluxes, if any, are added. I prefer to use with one hundred parts by weight of common clay, about ten parts by weight of ordinary feldspar and five parts of whiting.

The next step is the final grinding and sifting of this clay to the consistency of flour. During this process or while the ground clay is still in movement, I prefer to moisten the atmosphere around it so as to dampen the clay just enough to give it consistency in the presses.

The lining is composed of commercial kaolin, ball clay, feldspar, flint or quartz and whiting, which ingredients are reduced to a slip with water, sifted to remove impurities, separated by filter presses, dried and reground and sifted, in a manner well known in this art. They are then ready for use.

The exact composition of the lining material should be varied in accordance with variations observed in the particular common clay employed; the object being to prevent separation of layers due to unequal expansion during firing. It would, of course, be impossible to dictate the precise proportions for all cases.

Assuming, however, that the well known New Jersey clay known as "stoneware clay No. 1" be used, I have found the following proportions and ingredients to be very successful, the parts being named by weight:

| | |
|---|---|
| Kaolin | Twenty-six parts |
| Ball clay | Eighteen parts |
| Feldspar | Twenty-eight parts |
| Flint | Twenty three parts, and |
| Whiting | Five parts. |

The material for the glaze to be used on the above assumptions will be successful as follows—

| | |
|---|---|
| Quartz | Thirty six parts |
| Feldspar | Thirty two parts |
| China clay | Thirteen parts |
| Whiting | Six parts |
| Paris white | Four parts |
| Barium carbonate | Five parts, and |
| Bone ash | Four parts. |

In forming the tile I prefer to employ a well known form of mold, in which the bottom can be raised to the level of the top edge, or lowered to various heights, and the glazed tile may be made in one of various ways.

In proceeding by one method, the mold bottoms are very slightly lowered at first and the glazing material, which has been very finely pulverized in a pebble mill, is sifted over the molds. Over this is piled the lining material, also finely pulverized, and the same is leveled off by means of a flat bar in a well known manner. The bottoms of the molds are then fully lowered, and the common clay, prepared as above stated, is piled on and leveled off. The plunger is then depressed until the desired degree of compression is administered, after which the bottoms are raised and the tile is delivered all ready for firing.

If desired, this process can be followed out without first sifting the glazing powder over the molds, and, if the tile so produced be then fired, the process will be within the scope of my present invention, but a highly polished product will not result.

Again, the unfired tile produced as stated in the last paragraph may have the glazing powder sifted over it and be then fired, or the dipping process may be resorted to for applying the glaze. The sifting process last above described is quite successful, as the glazing powder adheres to the top surface of the tile and does not reach the sides or edges. The dipping process is not to be recommended, as the liquid runs down onto the edges and has to be wiped off.

The process of firing is very simple, and is only resorted to once. The articles are placed in saggers and piled close within the usual kiln, and in a relatively cool portion of the kiln is placed the usual observation cone for judging the temperature. The fires are lighted and the draft continuel until a "cone No. 6" begins to soften and droop, after which coal is added and the drafts are closed. The time of firing will, of course, depend upon the nature of the articles fired.

I have found that, by practising this process, a common clay body can be successfully united by an impermeable and thoroughly vitrified union to a vitrified leadless porcelain lining, and with its glaze, and that an article will be produced which has all the important advantages above set forth.

Various changes may be made in this process, and the proportions and ingredients of the materials mentioned may be changed to suit circumstances without departing from the scope of my invention, and I do not limit myself to the details herein described in this connection.

What I claim is—

1. The process of manufacturing ceramic articles which consists in mixing a vitrifying flux with common clay in suitable proportions to form a body, applying thereto an intermediate lining layer of vitrifiable porcelain powder, covering this second layer with a vitrifiable leadless glaze-forming material, and uniting the three layers by a single firing.

2. The process of manufacturing ceramic articles which consists in mixing a vitrifying flux with common clay in suitable proportions to form a body, powdering the same, covering the same while dry with a dry powdered layer of vitrifiable porcelain powder, covering this second layer with a dry powdered vitrifiable leadless glaze-forming material, compressing the three layers and uniting them by a single firing.

In testimony whereof, I affix my signature, in presence of two witnesses.

CHARLES STEGMAYER.

Witnesses:
 JOHN A. LINNETT.
 FRED TOCHIRNER.